Figure 1:
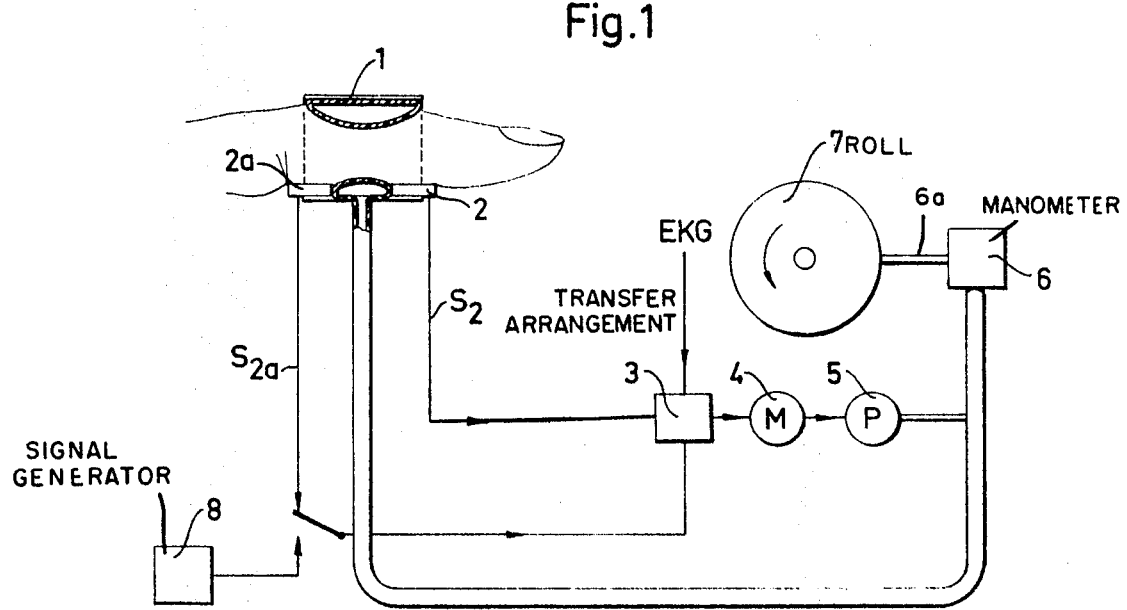

United States Patent

[11] 3,585,987

| | | | |
|---|---|---|---|
| [72] | Inventor | Arne Bejert Svensson Hagessten, Sweden | |
| [21] | Appl. No. | 750,320 | |
| [22] | Filed | Aug. 5, 1968 | |
| [45] | Patented | June 22, 1971 | |
| [73] | Assignee | Aktiebolaget Bofors | |
| [32] | Priority | Aug. 11, 1967 | |
| [33] | | Sweden | |
| [31] | | 11413/67 | |

[54] METHOD FOR AUTOMATIC CONTINUOUS MEASURING AND RECORDING OF BLOOD PRESSURE AND ARRANGEMENTS FOR EXECUTING SAID METHOD
11 Claims, 2 Drawing Figs.

[52] U.S. Cl. ............................................. 128/2.05 Q
[51] Int. Cl. ................................................. A61b 5/02
[50] Field of Search ......................................... 128/2.05 A, 205 R, 205 M, 205 Q, 205 V

[56] References Cited
UNITED STATES PATENTS

| 2,720,113 | 10/1955 | Statham ......................... | 128/2.05 X |
| 2,875,750 | 3/1959 | Boucke et al. .................. | 128/2.05 |
| 3,087,488 | 4/1963 | Streimer ......................... | 128/2.05 |
| 3,104,661 | 9/1963 | Halpern .......................... | 128/2.05 |
| 3,118,440 | 1/1964 | De Dobbeleer ............... | 128/2.05 |
| 3,132,643 | 5/1964 | Baum et al. .................... | 128/2.05 |
| 3,143,111 | 8/1964 | Green ............................. | 128/2.05 X |

Primary Examiner—William E. Kamm
Attorney—Sughrue, Rothwell, Mion, Zinn and Macpeak ABSTRACT: A method of automatic, continuous measurement and recording of blood pressure, by means of a blood pressure cuff, in e of a pressure externally applied by means of the cuff automatically is maintained substantially at an intended level. A signal determined by the relationship between the systolic pressure and the cuff pressure actuates the cuff pressure in such a way that when the relationship is altered, this alteration is counteracted by means of a raising or a lowering of the cuff pressure.

METHOD FOR AUTOMATIC CONTINUOUS MEASURING AND RECORDING OF BLOOD PRESSURE AND ARRANGEMENTS FOR EXECUTING SAID METHOD

The invention relates to a method of automatic continuous measurement and recording of blood pressure. Measurement of blood pressure usually is arranged in such a way, that a blood pressure cuff is placed on one of the limbs of a patient, preferably an arm, whereafter the cuff is manually pumped up during the simultaneous observation of the patient's pulse at the side of the cuff, which is turned away from the heart, seen in the direction of blood flow. When the beat of the pulse no longer can be observed as a result of the pressure derived from the cuff, air is slowly let out from the cuff until a very weak pulse can be noticed. The pressure which exists in the cuff is at this moment essentially equal to the systolic pressure. This method is generally used but is less well adapted in those cases, when blood pressures have to be continuously measured for certain length of time. Furthermore this method cannot give an absolutely reliable value of the blood pressure in view of the fact, that it is almost impossible to read the pressure of the cuff at the very instant, when the first pulses are allowed to pass in the blood vessel by the place, where the cuff is applied. When the cuff has been pumped up, the air furthermore must be let out very slowly for the reason, that the pressure in the same otherwise will fall too much between two successive pulse beats of the heart. If reduction of the pressure in the cuff occurs too rapidly, the obtained value of the blood pressure will be too low.

By the intensive treatment in the hospitals which is now occuring to an ever increasing extent it is of particularly great importance to be able to continuously measure and record the blood pressure of a patient at the hospital as well as measuring the patient's blood pressure in his daily life, all day and night. It is an object of the present invention to provide for this need and simultaneously to find a method, by which reliable values of the blood pressure are obtained. The method of automatic, continuous measurement and recording of blood pressure preferably by means of a blood pressure cuff, which surrounds a limb of the patient, is essentially characterized in that the size of a pressure externally applied by means of the cuff and approximately corresponding to the systolic pressure of a blood vessel, automatically is kept close to the intended level, and a signal generated by means of sensing means and dependent on the relationship between the systolic pressure and the cuff pressure, actuates the cuff pressure in such a way, that when said relationship is altered as a result of variations of the systolic pressure this alteration is counteracted by means of a raising or a lowering of the cuff pressure.

In doing so, it is suitable that the signal dependent upon said relationship for the actuation of the cuff pressure is compared with a signal which depends upon a reference pressure. Said signal dependent upon the reference pressure may preferably be generated by means of the patient's own blood pressure or by means of a fixed quantity, as for example a voltage.

The invention also relates to a device for carrying out the method, comprising a blood pressure cuff etc. and an instrument indicating the existing pressure in the cuff and preferably also recording the same, and is essentially characterized in that said device comprises a signal amplifying transfer arrangement, which can be actuated by means of at least one sensor, preferably arranged at the cuff, and means regulating the cuff pressure, said means being controlled by said transfer mechanism. It is also suitable to provide for a second sensor arranged so as to be substantially independent of the cuff pressure.

The signal generated in said second sensor is compared in the signal amplifying transfer arrangement with the signal from the first sensor.

Alternatively this second sensor may be replaced by a signal generator, which is not actuated by the patient's blood pressure. This signal generator is then adjusted to a predetermined value convenient for each measurement.

According to a preferable further development of the invention the firmly adjustable signal consists of the activation voltage of an electrical component, for example a transistor, at which the signal arriving from the sensor which indicates the blood pressure reduced by means of the cuff, is adjusted to a suitable level in, for example, a voltage divider.

Figure 2:
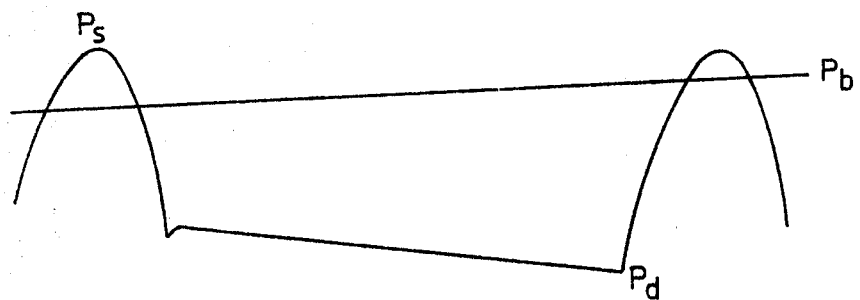

The invention is illustrated by way of example in connection with the preferred embodiments shown in the accompanying drawing, in which: FIG. 1 shows a skeleton drawing of the invention, and FIG. 2 shows a pressure diagram.

Referring now to FIG. 1 there is shown a limb (preferably a finger, an arm, a leg, a toe etc.) in which the blood pressure is to be measured, surrounded by a blood pressure cuff 1. Below the blood pressure cuff 1 a sensor 2 is arranged, the purpose of which is to detect the pulse wave from the heart and to generate an electrical pulse, which is amplified and rectified in a transfer arrangement 3, and, by means of a motor 4 controls the pressure of a pump 5 and a manometer 6. The amplitude of the signal is compared with a value preadjusted in a signal generator 8 or alternatively comparison is made with the size and time position of the pulse in another sensor 2a, which is placed in such a way, that it will essentially not be actuated by the pressure in the cuff 1. If the time delay which exists between the signal S2 generated in the sensor 2 and the signal S2a generated in the sensor 2a, falls below a predetermined value, the motor 4 actuates the pump 5 in such a way that the pressure of the cuff 1 is increased. Alternatively the comparisons between the two signals S2 and S2a may be carried out in such a way, that a raising of the pressure of the cuff 1 is obtained, if the quotient between S2a and S2 falls below a predetermined value. If, on the other hand, said time delay or quotient exceeds the predetermined value, the pressure of the cuff 1 is lowered by means of the motor 4 and the pump 5. Of course, it is possible to combine said two methods of comparing the signals S2 and S2a.

Thus, the time delay and/or the quotient between the signals S2 and S2a from the two sensors 2 and 2a is adjusted to a predetermined value by means of the pressure of the cuff. The pressure, which then appears in the cuff, is indicated by means of a manometer 6, the arm 6a of which moves over pressure sensitive recording paper on a roll 7. When the blood pressure varies, the pressure of the cuff also varies, said pressure being continuously recorded on the recording paper on a roll 7.

As an alternative to the sensor 2a, a signal generator 8 may be used, which is adjustable in such a way that the signal generated by the same constitutes a fractional part of the sensor signal at an applied pressure, which falls below the diastolic blood pressure, as for instance 59 mm. Hg.

The relationship between the systolic pressure, the diastolic pressure and the pressure which appears in the cuff then becomes $$P_b = P_s - \eta(P_1 P_d)$$

wherein
$P_s$ = systolic pressure,
$P_d$ = diastolic pressure, and
$P_b$ = balance in the automatic control system, $$\eta = \frac{S_2}{S_{2a}} \text{ or } = \frac{S_2 \text{ at balance}}{S_2 \text{ at } P < P_d}$$

$$\text{or } \eta = \frac{S_2 \text{ at balance}}{S_2 \text{ at } P = 50 \text{mm Hg}}$$

according to the embodiment of the invention used.

These pressures are indicated by the above letters in the pressure diagram in FIG. 2 of the drawing where the systolic pressure from 2 pulse beats and the diastolic pressure between these beats are represented in a graph and where the pressure which appears in the cuff is represented as a straight line. The straight line always crosses the graph at each peak, i.e., the cuff pressure is kept just below the systolic pressure.

According to the invention the sensor 2 will be applied to the tissue with a pressure, which is determined by the pressure of the cuff, which involves the following advantages:

a. no particular fastening of the sensor is required, b. when measuring is not going on and the pressure of the cuff falls to zero, the sensor is not pressed against the skin in an irritating manner.

c. the sensor is fastened in an optimal way in order to avoid influences of movements.

Thus, the factor $\eta$ is the above mentioned quotient. If the same is selected to be very low, the cuff pressure is brought nearer the systolic pressure. However, a low value of $\eta$ causes a high interference sensitivity. At a value of $\eta$ which is close to 1, $P_b$ is substantially influenced by the diastolic pressure. For this reason $\eta$ is suitably selected to be between 0,15 and 0,5. The sensor 2 may be directly or indirectly sensing the flow of pressure or the filling of blood. If then an optoelectrical sensor is used, the spectrophotoelectrical sensitivity of the source of light and of the light sensing element as much as possible is selected to be equal for oxyhemoglobin and hemoglobin. In this way the blood pressure indicator is not influenced by the varying degree of oxygenation of the blood. The cuff may be filled with either air or liquid. When measuring on peripherally placed limbs, for example a finger, the limb must be kept on a certain level, namely at the level of the heart, in order to obtain accurate values in the case that the system should be filled with air. For this reason, corrections must be made for the position of the hand, during measurement of persons at work. However, the arrangement may be carried out in such a way that the recorded value becomes independent swing of the position of the hand. The different parts of the arrangement, except for the cuff and the sensor, are then brought together with the corresponding tubing to a unit intended to be put in a belt under the left arm at the level of the heart, and cuff and tubings are filled with a liquid, the density of which is proportioned against the density of the blood.

If the arm during the measurement on, for example, a finger, is swinging to and fro, forces of inertia appear in the blood, which forces influence the measured blood pressure. If the tubing transmission characteristics in relation to pressure variations induced by inertia are proportioned against the artery transmission characteristics in relation to variations induced by inertia, the measured blood pressure is not being influenced by the position of the hand or by the movements of the same. If further the amplifier is utilized with a lower limiting frequency of approximately 1 Hz. and an upper limiting frequency of approximately 6 Hz., the best signal-noise ratio is achieved. When ECG is available the hardiness to interference is further increased by means of keyed detection, rectification then only occuring during the time interval immediately after R-blip of the QRS-wave of the ECG.

By means of the motor 4 and the pump 5 the amplifier 3 controls the pressure of the cuff in such a way, that a deviation from a desired quotient or time delay creates a speed of alteration which is proportional to the deviation. The highest speed of alteration is preferably restricted to 5 mm. Hg. per second. Thus, if the signal from the sensors is interfered with by influences from movements or something else, these become integrated, and accordingly separate influences can not sway the measured and recorded blood pressure.

The recording of the measured values is accomplished by means of the movable arm of the manometer, which is pressed against a pressure-sensitive paper, either at determined time intervals thus giving a great number of points of measurement, the average value of which is a time average value, or in pace with the movement of the motor. Since the motor functions only when the pressure requires adjustment, values of measurement are only recorded during unbalance, the deviations from the average value being then accentuated in the obtained recording. According to a third alternative the depression of the arm of the manometer occurs at balance, only the maximum and minimum values of the pressure being recorded.

The device automatically carries out recording continuously during 24 h., but since it is often not necessary to record continuously during such a long time, the measurement may be carried out discontinuously, for example, during 2 minutes each 15 minutes. During the 2 minute interval a great number of values of measurement are recorded, the average value of which thus is representative for the pressure during said interval.

Although the invention has been described in connection to some embodiments of the same, it may be varied within the scope of the following claims.

I claim:

1. In a method of automatic, continuous measurement and recording of blood pressure by a blood pressure cuff surrounding one of a patient's limbs wherein the size of a pressure externally applied by the cuff and approximately corresponding to the systolic pressure of a blood vessel automatically is kept close to the systolic pressure, the improvement comprising: the steps of generating a first signal by a sensing means that is dependent on the difference between the systolic pressure and the cuff pressure, generating a second signal dependent on a reference pressure and essentially independent of the cuff pressure, comparing said first signal with said second signal, and adjusting the cuff pressure in response to the comparison of the first and second signals to maintain the cuff pressure somewhat below the systolic pressure.

2. A method according to claim 1, wherein the second signal is essentially proportional to the existing pulse pressure.

3. A method according to claim 1, wherein said reference pressure has a predetermined fixed value.

4. A method according to claim 1, wherein the adjusting of the cuff pressure is carried out at a speed amounting to a maximum of 5 mm. Hg. per second.

5. A device for carrying out the method according to claim 1, comprising a blood pressure cuff, a sensor positioned at the cuff, an instrument connected to the cuff for indicating and recording the pressure of the cuff, an amplifying and rectifying transfer mechanism connected to and actuated by said sensor, means connected to said cuff for regulating the cuff pressure, said regulating means being connected to and controlled by said transfer mechanism, and a second sensor connected to the transfer mechanism, said second sensor being arranged in the cuff and being essentially independent of the cuff pressure.

6. A device according to claim 5, further comprising a signal generator, the outgoing signal of which is adjustable and independent of the pressure existing in the cuff and the blood vessel, and means are provided for connecting said second sensor or said signal generator to the transfer mechanism.

7. A device according to claim 5, wherein the means regulating the pressure of the cuff comprises a pump assembly, and a motor driving said pump assembly.

8. A device according to claim 5, wherein the means regulating the pressure of the cuff comprises an electrically driven pump assembly having a container of variable volume.

9. A device according to claim 7, wherein the indicating and recording instrument is provided with pressure sensitive paper and a manometer having a movable manometer arm which is adapted to press upon the pressure sensitive paper, the frequency of pressure movements of said arm being proportional to the speed of the motor driving the pump assembly.

10. A device according to claim 7, wherein the indicating and recording instrument is provided with pressure sensitive paper and a manometer having a movable manometer arm pressing upon the pressure sensitive paper, the frequency of pressure movements of said arm being proportional to the speed of the motor driving the pump assembly, and wherein means are provided for pressing said manometer arm against the pressure sensitive paper at regular time intervals.

11. A device according to claim 7, wherein the indicating and recording instrument is provided with pressure sensitive paper and a manometer having a movable manometer arm pressing upon the pressure sensitive paper, the frequency of pressure movements of said arm being proportional to the speed of the motor driving the pump assembly, and wherein means are provided for pressing said manometer arm against the pressure sensitive paper when the motor is at a stand still.